United States Patent [19]

Carter

[11] 4,290,379

[45] Sep. 22, 1981

[54] SUPPRESSION OF SURFACE FOAM ON DETERGENT-CONTAMINATED LAGOONS

[76] Inventor: Festus A. Carter, Rte. 1, Highway 341 North, Odum, Ga. 31555

[21] Appl. No.: 61,916

[22] Filed: Jul. 30, 1979

[51] Int. Cl.³ .................. C02C 1/08; A62C 27/00
[52] U.S. Cl. ...................... 114/26; 114/270; 55/178; 210/767
[58] Field of Search .......... 210/DIG. 25, 26, 242 S, 210/221 R, 221 M, 221 P, 170; 169/2 S; 115/12 R; 114/232, 26, 270; 55/178

[56] References Cited

U.S. PATENT DOCUMENTS

| | | | |
|---|---|---|---|
| 2,983,508 | 5/1961 | Modne | 272/8 |
| 3,056,749 | 10/1962 | Griffith | 210/221 |
| 3,169,921 | 2/1965 | Griffith | 210/170 |
| 3,220,706 | 11/1965 | Valdespino | 210/221 R |
| 3,320,160 | 5/1967 | Welles et al. | 210/14 |
| 3,339,516 | 9/1967 | Lenci | 115/12 R |
| 3,384,047 | 5/1968 | Remley | 115/12 R |
| 3,496,901 | 2/1970 | Stanfield et al. | 115/12 |
| 3,521,864 | 7/1970 | Welles, Jr. | 261/77 |
| 3,561,601 | 2/1971 | McNeely | 210/242 |
| 3,735,926 | 5/1973 | Ravitts | 239/16 |
| 3,885,331 | 5/1975 | Mathieu | 115/12 R |
| 3,925,038 | 12/1975 | Wiemer et al. | 210/221 |
| 3,962,093 | 6/1976 | Gibson | 210/DIG. 25 |
| 4,009,100 | 2/1977 | Hess et al. | 210/170 |
| 4,033,869 | 7/1977 | McGrew | 210/DIG. 25 |
| 4,046,691 | 9/1977 | Irons | 210/DIG. 25 |
| 4,119,152 | 10/1978 | Koyama | 169/2 S |
| 4,126,547 | 11/1978 | Kyris | 210/19 |

FOREIGN PATENT DOCUMENTS

| 21703 | of 1905 | United Kingdom | 114/232 |
|---|---|---|---|
| 931594 | 11/1961 | United Kingdom | 210/DIG. 26 |

Primary Examiner—Theodore A. Granger
Attorney, Agent, or Firm—Sutherland, Asbill & Brennan

[57] ABSTRACT

Foam build-up is held in check on a detergent-contaminated lagoon or the like by traversing the surface with a powered barge having a pump for extraction of sub-surface water from the lagoon, connected with means encircling the bow of the barge for spraying the water horizontally over the surface of the lagoon.

4 Claims, 4 Drawing Figures

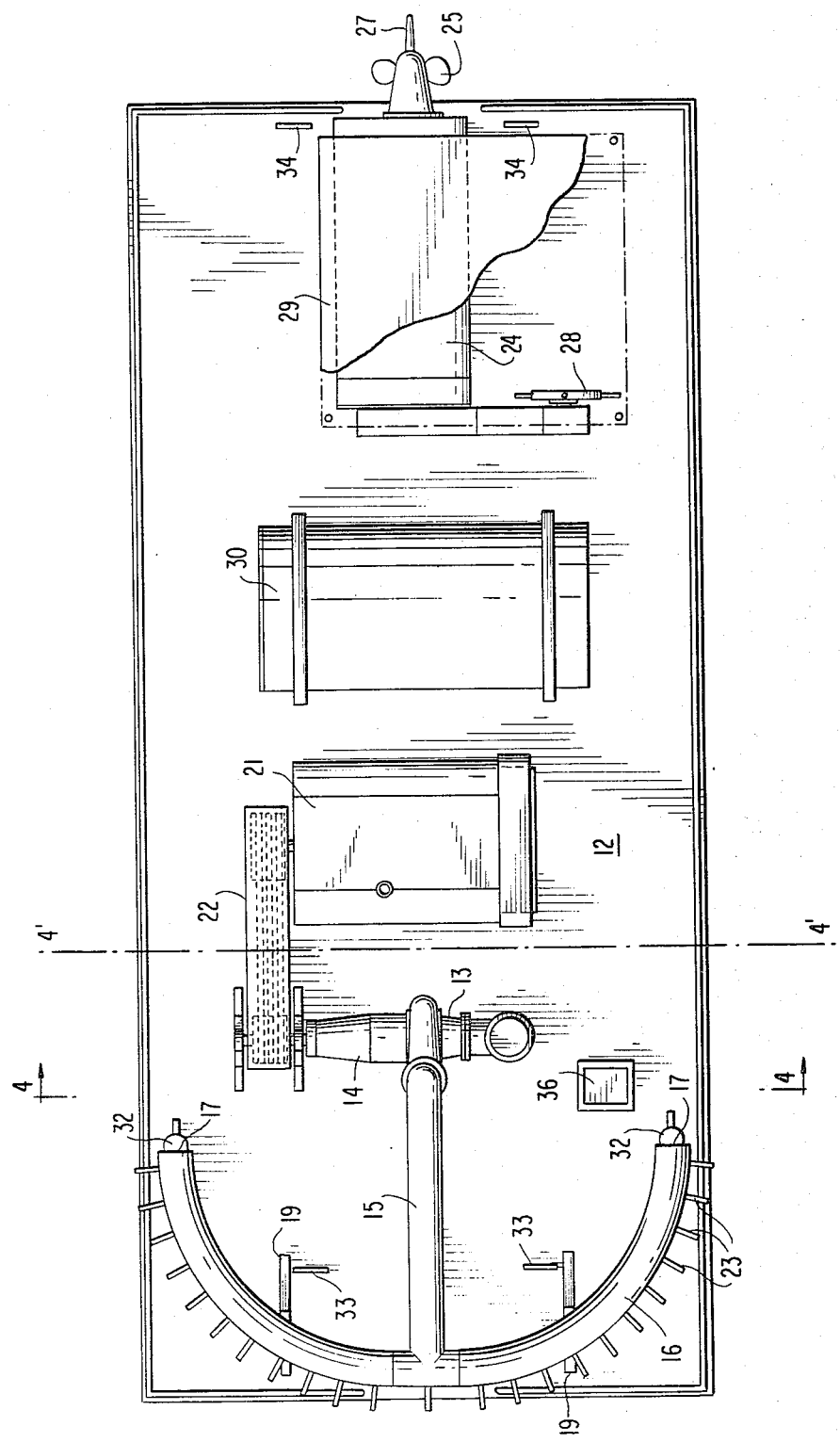

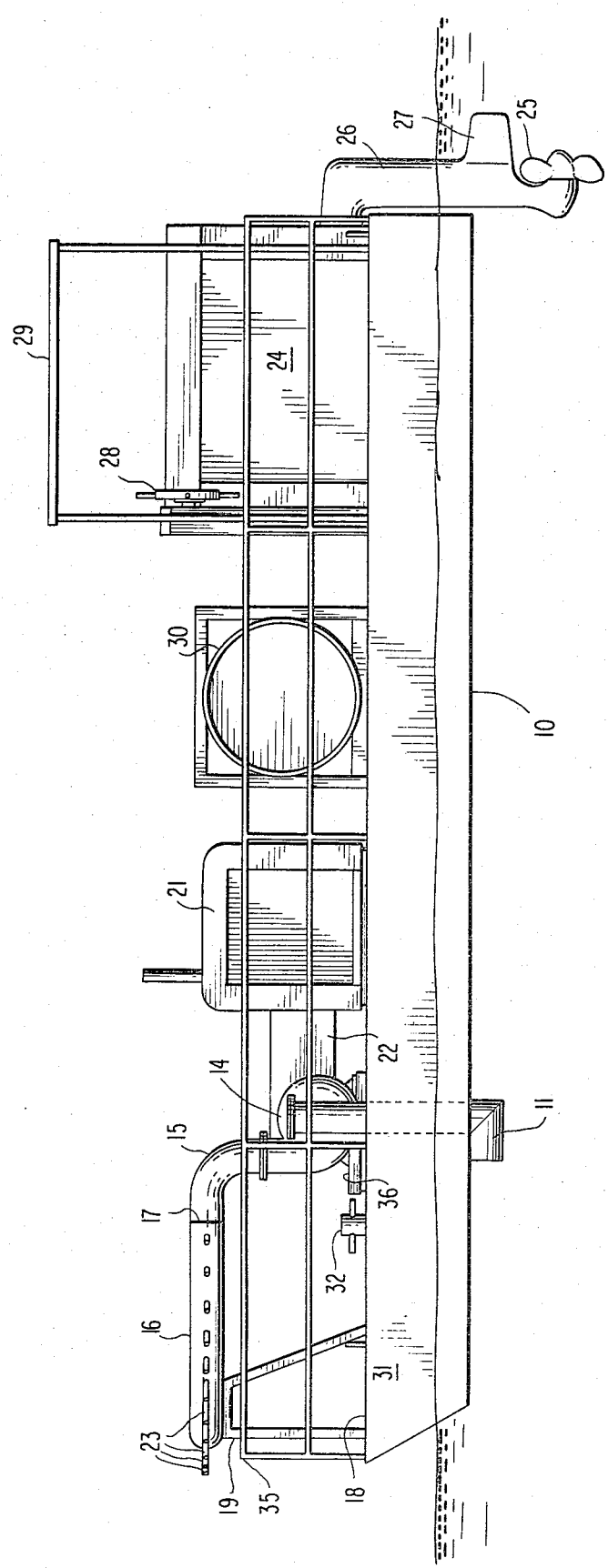

SUPPRESSION OF SURFACE FOAM ON DETERGENT-CONTAMINATED LAGOONS

This invention is directed to a machine and method for suppressing foam on the surface of a detergent-contaminated body of water.

The formation of foam in waste treatment basins and the like is a problem which has taken on added dimension as a result of the enactment in recent years of various federal and state regulations controlling water and air pollution. The paper industry presents a good example of the problem. In the manufacture of wood pulp by chemical processes, such as the sulfite process, a waste liquor is ordinarily generated which contains some compounds having detergent properties. In many instances the liquor must be disposed of by putting it in a waste treatment basin. In such a basin the water is rather violently agitated in order to oxygenate it and facilitate the degradation of the waste chemicals into ecologically harmless ones. This agitation causes foam build-up on the surface of the water, which, if unchecked, can reach a depth as great as 4 or 5 feet.

The surface layer of thick foam on a water treatment basin dries quickly, especially on sunny days, thus weakening its cellular structure and lightening its weight. As a consequence, it is borne aloft by the merest of breezes. Not infrequently, enough waste chemicals are carried in this manner into the air, off the surface of treatment basins, to place the owners in violation of federal or state clean air standards.

To suppress the foam in detergent-contaminated waste treatment basins, the most common procedure resorted to is the addition of chemical defoamants to the water. This is often accomplished by means of a network of stationary spray heads rising above the surface of the basin, which are connected to a supply tank of the chemical defoamant as well as to pump means for forcing the defoamant through the spray heads. While this technique can be effective to suppress surface foam, and thereby avoid the air pollution problem, it has the disadvantage of frequently creating such a build-up of the defoamant in the basin water, that water pollution regulations are violated.

The present invention provides a solution to the foam problem on detergent-contaminated lagoons and the like which avoids excessive build-up of chemical defoamants in the body of water being treated. The method of suppressing foam according to the present invention comprises the steps of extracting water from beneath the surface of the body of water, e.g., about two to two-and-a-half feet beneath the surface, spraying the extracted water horizontally over the surface of the body of water from a distance of about five to seven feet above the surface, and continuously moving the locus of the spraying across the surface of the body of water.

Preferably, the spraying is conducted in a generally semi-circular pattern, e.g., a semi-circle having an outer diameter of about seventy-five to one hundred feet.

Preferably, the spary of sub-surface water will contain both large and small water droplets. The large water droplets, as they rain down upon the surface of the detergent-contaminated body of water, rupture the foam's cellular structure and cause it to collapse, especially the upper layer of the foam, which will ordinarily be partially dehydrated and weakened. The small water droplets serve to help dampen the lower region of the foam, keeping it heavy enough to resist being blown away.

To carry out the foam suppression method of the present invention, it is preferred to use a machine comprised of a powered barge;

a horizontally disposed, C-shaped pipe mounted on the barge above the gunnels, the length, configuration, and placement of the pipe being such that the pipe generally encircles the bow and extends part way along each side of the barge, the pipe having no outlet except for a series of horizontally directed spray nozzles projecting therefrom along substantially the entire length of the pipe; and pump means carried by the barge for removing sub-surface water from the body of water on which the barge is floating and delivering that sub-surface water to the pipe under sufficient pressure that it is forced out of all of the spray nozzles simultaneously and is caused to rain down on the surface of the water around the bow and sides of the barge.

The pump means carried by the barge of the present invention is preferably capable of producing enough pressure in the C-shaped pipe that the water forced out of the spray nozzles is propelled a distance of about thirty to forty-five feet, at its furthest reach, from the topside of the barge.

Obviously, the optimum figures for the capacity of the pump, the size of the piping and spray nozzles, the width of the barge, and so forth, are all interdependent. The preferred size of one will depend to some extent upon the sizes of the others. The object is to mate the various pieces of equipment in such a manner that the machine will lay down a pattern of water droplets which will rupture and wet the foam structure. It may be useful nonetheless to suggest some illustrative dimensions for the various elements of the machine.

For a barge having a beam of about sixteen feet, use of a C-shaped pipe having an internal diameter of about eight to twelve inches may be preferred, in combination with spray nozzles having openings of about $\frac{3}{4}$ to $1\frac{1}{4}$ inches in diameter, and a pump having a capacity of about 5000 to 6000 gallons of water per minute. Preferably, the C-shaped pipe is mounted about five to seven feet above the waterline, and the spray nozzles are spaced no more than about fifteen inches apart from one another.

A preferred type of spray nozzle is a short section of straight pipe, for example about 8 to 10 inches long. The placement of the nozzles around the periphery of the C-shaped pipe is preferably such that the machine will lay down a uniform pattern of water. For this reason it is preferred that those nozzles which are located on the most curved sections of the pipe be spaced closer together than are the remainder of the spray nozzles.

The invention will perhaps be better understood by reviewing the accompanying drawings, a discussion of which now follows.

FIG. 2 is a top view, partially broken away, of the barge shown in FIG. 1.

FIG. 3 is a view from off the port side of the barge shown in FIG. 1.

Figure 1:
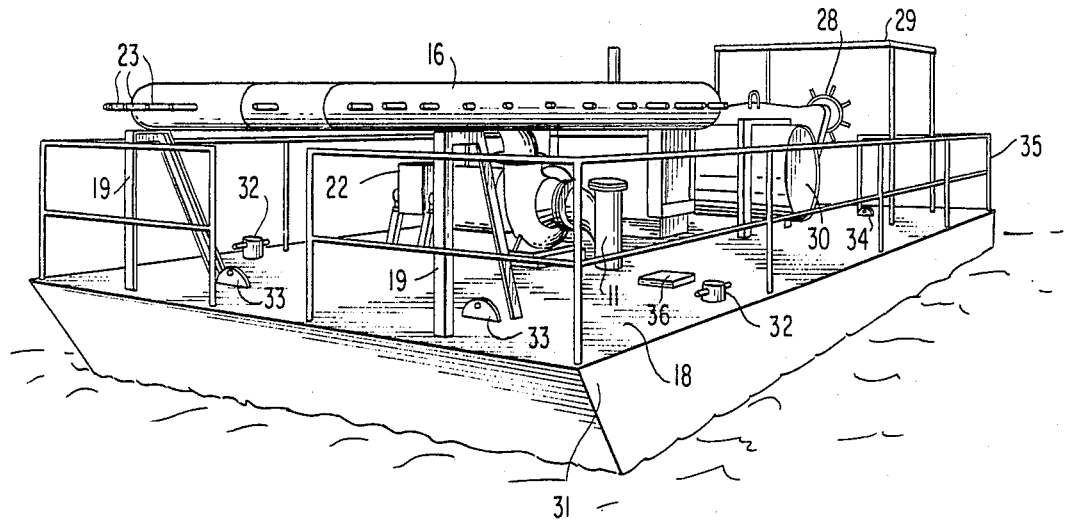
FIG. 1 is a perspective view from off the port bow of a preferred embodiment of a foam-suppressing barge of the present invention.
Figure 4:
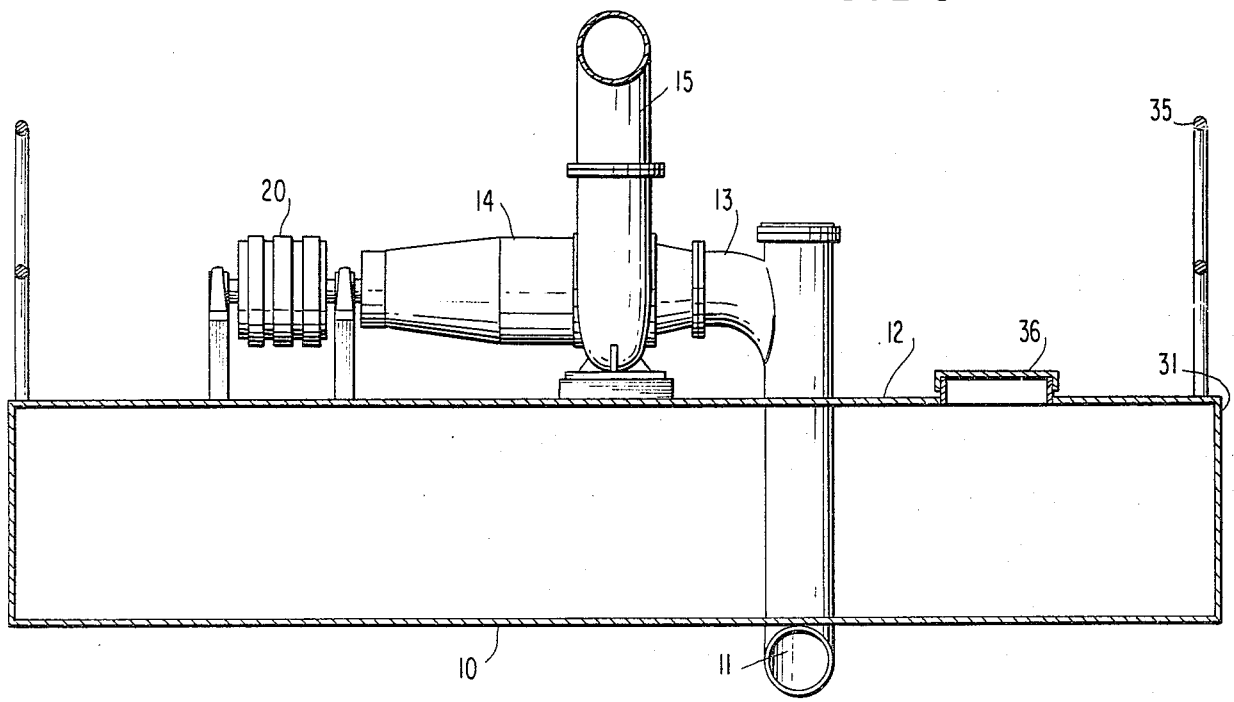

FIG. 4 is a front sectional view, between the lines 4—4 and 4'—4' of FIG. 2, with belt guard 20 broken away.

As shown in these drawings, the barge is a shallow draft vessel, for example about 36 feet in length and 16 feet in beam, having a flat bottom 10, through which protrudes a curved water inlet pipe 11. Pipe 11 extends through bottom 10 and deck 12 of the barge, and is joined to elbow 13 above-deck. Elbow 13, in turn, is in communication with the inlet side of centrifugal water pump 14, the discharge side of which is connected via curved pipe section 15 to C-shaped pipe 16, which has closed ends 17 and an internal diameter of 10 inches.

Pipe 16 is supported above the gunnels 18 of the barge by means of braces 19.

For the barge shown in the drawings, pump 14 might advantageously be a 10 inch pump, capable of pumping 7,500 gallons of water per minute.

Pump 14 is driven by drive belt 20, which in turn is driven by diesel engine 21, which is dedicated solely to driving pump 14. In other words, there are two engines aboard the barge, one to drive the water pump, the other to propel the barge. In this manner the barge can be slowed when passing through a field of especially deep foam, without slowing the pump as well.

Belt guard 22 surrounds belt 20 for safety purposes.

A series of horizontally directed spray nozzles 23 projects outwardly from C-shaped pipe 16. Those nozzles depicted in the drawings are each 6 inches long and have 1 inch diameter orifices.

Sub-surface water which is scooped up by inlet pipe 11 is pumped out of nozzles 23 with enough force to lay down a half-umbrella of foam-suppressing water around the bow of the barge. To provide substantially uniform density throughout the rain pattern, those nozzles 23 which are located in the most curved sections of pipe 16 are spaced closer together, for example 9 to 11 inches apart, than are the nozzles located elsewhere along the pipe. In the straight center section of pipe 16, for instance, the nozzles might be spread as much as 14 to 16 inches apart.

The barge is powered by a propulsion drive unit 24, e.g., a Harbormaster unit, located at the stern. Drive unit 24 has a diesel engine (not shown) as its power plant. Propulsion is provided by screw 25, which is connected via transmission means (not shown) with the diesel engine, and is mounted on rotatable arm 26, which also carries a rudder 27. Rotation of arm 26 is controlled by ship's wheel 28. Canopy 29 (shown partially broken away in FIG. 2), protects the pilot of the barge. Fuel tank 30 supplies diesel oil to both diesel engine 21 and propulsion drive unit 24.

Deck cleats 32 enable the barge to be tied to a dock, while front and aft lifting pads 33 and 34 permit the barge to be raised out of the water by a crane (not shown). Deck 12 is surrounded by railing 35. Hatch 36 permits one to go belowdeck in order to repair leaks, store lines and equipment, etc.

Use of the barge depicted in the drawings is quite straightforward. It is simply navigated in an all-over pattern on the surface of the detergent-contaminated body of water. Given the dimensions just suggested, the barge of the drawings will lay down a rain pattern extending outward about 30 to 45 feet from the topside 31 of the barge, providing enough foam suppression for, for example, an eighty-five acre treatment basin.

When it is desired to move the barge to another basin, cables can be attached to lifting pads 33 and 34, and the barge lifted onto a low-boy and portaged to the other basin.

I claim:

1. A machine for suppressing foam on the surface of a detergent-contaminated body of water, comprised of
   a powered barge;
   a horizontally disposed, C-shaped pipe having an internal diameter of about 8 to 12 inches mounted on the barge above the gunnels at a height of about 5 to 7 feet above the waterline, the length, configuration, and placement of the pipe being such that the pipe generally encircles the bow and extends part way along each side of the barge, said pipe having no outlet except for a series of horizontally directed sections of straight pipe about 8 to 10 inches long, having an internal diameter of about $\frac{3}{4}$ to $1\frac{1}{2}$ inches, projecting therefrom along substantially the entire length of the pipe; and
   pump means carried by the barge for removing sub-surface water from the body of water on which the barge is floating and delivering that sub-surface water to the pipe under sufficient pressure that the water is forced out of all of the sections of straight pipe simultaneously and is propelled a distance of about 30 to 45 feet, at its furthest search, from the topside of the barge.

2. The machine of claim 1 wherein the sections of straight pipe are no more than about fifteen inches apart from one another.

3. The machine of claim 1 wherein those sections of straight pipe which are located on the most curved sections of the pipe are spaced closer together than are the remainder of the sections of straight pipe.

4. The machine of claim 2 wherein those sections of straight pipe which are located on the most curved sections of the pipe are spaced closer together than are the remainder of the sections of straight pipe.

* * * * *